United States Patent [19]

Kampers

[11] Patent Number: 4,564,449
[45] Date of Patent: Jan. 14, 1986

[54] DEVICE FOR SEPARATING TWO LIQUIDS OF DIFFERENT DENSITY

[75] Inventor: Gerrit Kampers, Puttershoek, Netherlands

[73] Assignee: Doseq Dutch Oil Spill Eq v.o.f., Netherlands

[21] Appl. No.: 467,329

[22] Filed: Feb. 17, 1983

[30] Foreign Application Priority Data

Feb. 19, 1982 [NL] Netherlands ............ 8200679

[51] Int. Cl.⁴ .................................. E02B 15/04
[52] U.S. Cl. ........................ 210/242.3; 210/923
[58] Field of Search ............. 210/242.3, 104, 924, 210/923, 527, 517, 242.1, 123

[56] References Cited

U.S. PATENT DOCUMENTS

| | | | |
|---|---|---|---|
| 1,450,545 | 4/1923 | Hans | 210/923 |
| 3,476,246 | 11/1969 | Dahan | 210/242.1 |
| 3,722,688 | 3/1973 | Wirsching | 210/242.3 |
| 3,741,391 | 6/1973 | Donsbach | 210/123 |
| 3,853,768 | 12/1974 | Bagnulo | 210/242 |
| 3,909,417 | 9/1975 | Rafael | 210/242 |
| 3,945,115 | 7/1973 | Olsen | 210/923 |
| 4,372,854 | 2/1983 | Szereday | 210/923 |

FOREIGN PATENT DOCUMENTS 2095493 3/1971 France .
7216219 7/1973 Netherlands .
7313108 3/1974 Netherlands .
2044625 10/1980 United Kingdom .

Primary Examiner—Richard V. Fisher
Assistant Examiner—Sharon T. Cohen
Attorney, Agent, or Firm—Andrus, Sceales, Starke & Sawall

[57] ABSTRACT

A separating device for two liquids of different density, in particular for separating an oil layer floating on a liquid surface by means of an over flow edge on a weir, said edge being positioned in the area of the boundary layer of the two liquids. The separating wall provided with the over flow edge has an convex-concave shape in a vertical direction and seals against the inside of the convex weir whereby an improved sealing with less leakage is obtained.

The separating wall is hollow and can be accurately positioned vertically by remote control by means of supplying more or less air under pressure to the inside of the separating wall so that the buoyancy thereof can be varied according to the thickness of the oil layer. For obtaining a quick response to wave action a float is positioned in front of the separating wall and controls the vertical position thereof starting from the adjusted nominal position reached by the remote control by air pressure.

4 Claims, 1 Drawing Figure

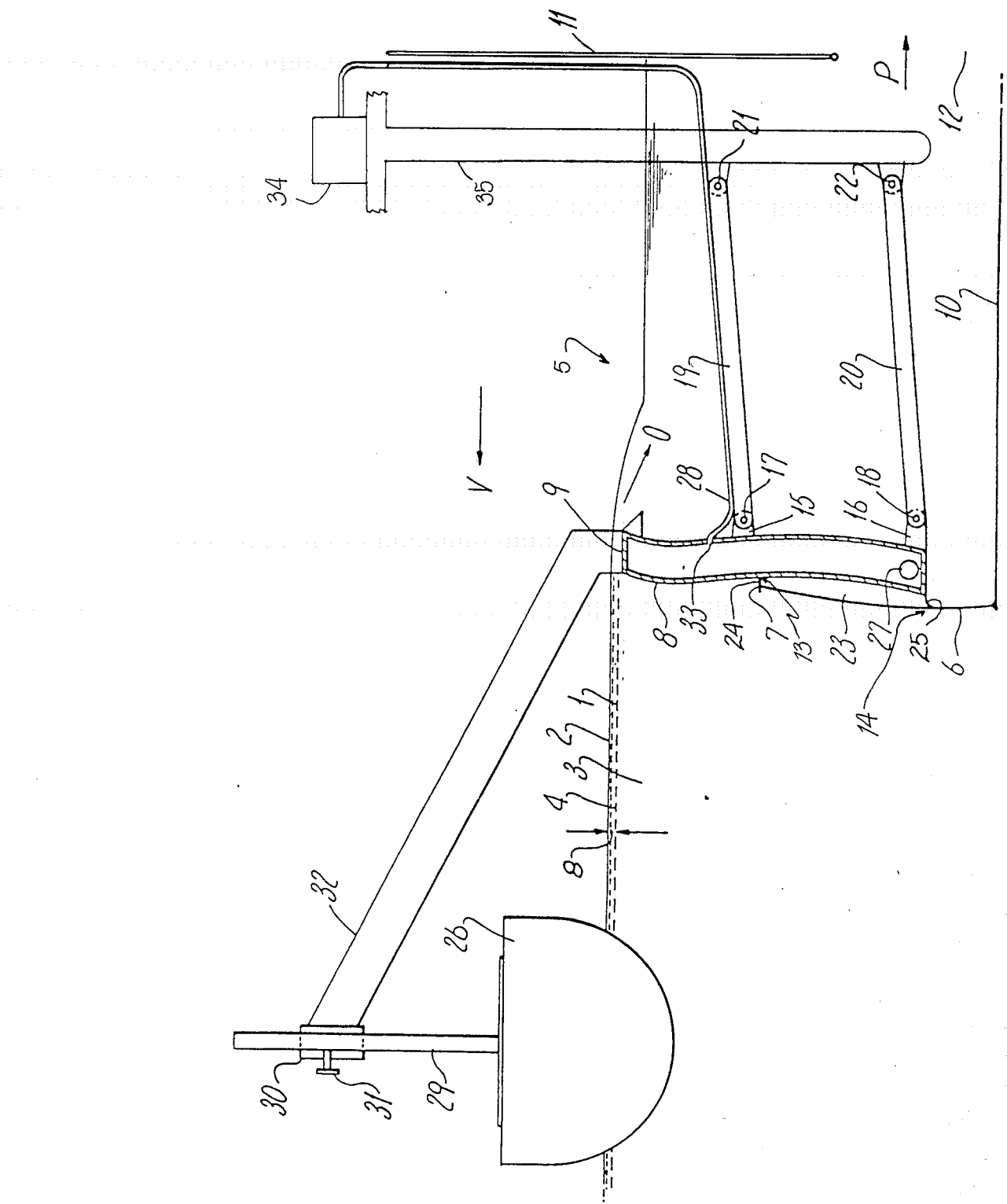

DEVICE FOR SEPARATING TWO LIQUIDS OF DIFFERENT DENSITY

The invention relates to a device for separating two liquids of different density, particularly a device for separating an oil layer floating on a liquid surface. The device comprises a support which is moved relative to the liquid surface, said support carrying an overflow separator, the overflow edge of which extends upwardly into the area of the boundary layer between the oil and the liquid and is adjustable in a vertical direction according to the thickness of the oil layer and/or the wave or other movements of the liquid. The oil layer which is raised in front of the separator flows substantially over the overflow edge into a vessel from which the collected mixture of oil and liquid can be removed. The overflow edge is part of a separating wall which is, at least in the upper portion, is convex. The separating wall is sealed off with respect to a fixed weir, which extends below the liquid surface and has at least one concave surface which is turned away from the direction of movement.

A separating device of this type is known from practice. Here the bent separating wall and the weir are shaped complimentary. This has as a result that there always occurs a substantial leakage between both walls, so that undesired, large quantities of liquid flow between both walls into the collecting vessel which lies behind the separating wall and weir. The large quantity of liquid rejoins the oil which was separated, so that the efficiency of the separator is limited. This leakage is inherent to the complimentary shape and can only be reduced in a very limited way by reducing the play between both walls, as otherwise there is the chance that the separating wall becomes stuck and the entire separating operation is jeopardized. The aim of the invention is removing this objection, which is achieved in that the separating wall is provided, below the convex upper portion, with a concave surface that is turned into the direction of movement, said concave surface sealing against the oppositely directed, concave surface of the weir along two mutually parallel horizontal lines.

According to a preferred embodiment of the invention the convex-concave bent separating wall is provided with at least two vertically spaced lugs, that are pivotally connected by parallel pivotally mounted connecting rods to pivot shafts fixedly connected to a base member part of the separating device and separated by substantially the same vertical distance as the lugs.

By this preferred mechanism of movement a dependable movement of the separating wall is obtained without jeopardizing the sealing against the weir in certain positions. According to yet another embodiment of the invention the convex bent separating wall is internally hollow and floats in the liquid, by which a more sensitive adjustment is possible. The invention will now further be elucidated referring to the accompanying schematic drawing showing a cross section of a preferential embodiment.

According to the drawing the oil layer 1 has the level 2 and a thickness of layer $\delta$, so that the liquid 3 is present below the oil layer 1. Between the oil layer 1 and the liquid 3 there is a boundary layer 4, which is according to the circumstances, such as the wave and other movements of the liquid 3, may or may not be regularly formed with oil layer 1.

The separating device which is generally indicated with 5 is moved with a velocity V in the direction of the arrow. The device 5 comprises a vessel provided with a plate shaped weir 6 that is bent convexly into the direction of movement. This weir 6 has an upper edge 7 which extends under the boundary layer 4, while the separating wall 8 is vertically adjustable along the inside of this weir 6. The overflow edge 9 of the separating wall 8 should be adjusted into the area of the boundary layer 4. Furthermore the vessel has a bottom 10 and an end wall 11, which is provided at the lower side with an outlet 12 for liquid. The separating wall 8 is convex, in the upper portion, in the direction of flow, so that the flow of the oil layer 1 over the over flow edge 9 is promoted. Below the convex part the separating wall is concave in the direction of movement, thus there are formed two mutually parallel substantially horizontal contact and sealing lines 13,14 with the concave inside surface of the weir 6. The sealing line 13 lies at a fixed place, namely at the inside of the upper edge 7 of the weir 6. The lowermost sealing line 14 moves along the inside of the weir 6 according to the upward or downward movement of the separating wall 8. At the location of the sealing lines 13 and 14 strip-shaped sealing elements 24 and 25 respectively can be arranged.

The separating wall 8 is internally hollow and can float in the liquid 3. In such case a part of the buoyancy is supplied by the float 26, which also takes part in, and assures, the vertical adjustment of the separating wall 8. The float 26 is suspended on the rod 29 which is adjustably mounted in a slide connector 30 in which the rod 29 can be fixed with a set screw 31. The connector 30 is located at the one end of a support rod 32 which projects forwardly from the separating wall 8. Thus the float 26 is located some distance in front of the separating wall 8 and reacts therefore somewhat faster to wave movements then the separating wall 8 itself, by which the separating effect thereof is further improved.

At the lower side of the separating wall 8 in opening 27 for liquid is provided, while near the upper edge 9 air under pressure can be supplied from air supply 34 and also removed through an opening 33 and a flexible air hose 28. Thus a remote controllable very sensitive positioning of the floating separating wall 8 is possible.

On the inside of the separating wall 8 which is turned towards the inside of the vessel at two locations spaced above each other a lug 15 and 16 respectively is fastened, which are connected by means of the pivot shafts 17 and 18 respectively to the one end of the connecting rods 19 and 20 respectively, of which the other end is coupled by means of the pivot shafts 21 and 22 respectively with a base member 35 part of the separating device 5.

Between the inside of the weir 6 and the lower part of the front side of the separating wall 8 between the sealing lines 13 and 14 a space 23 shaped in cross section like a convex lens is delimited of constantly varying volume which is more or less filled with liquid. This space also takes part in the sealing, by which the leakage of liquid 3, generally water, from the outside to the inside of the vessel of the device 5 is kept to a minimum so that the mixture of oil and water inside the vessel 5 is rich on oil. The water inside the vessel descends and can be removed through the outlet 12 in the direction of the arrow P.

I claim:

1. A device for separating a first, lower density liquid from a second, higher density liquid, said liquids having a boundary layer between them, said device being horizontally movable relative to the liquids and comprising:

a support means (26–32) positionable with respect to the exposed, upper surface of the liquids;

a generally vertical, separating wall (8) immersible in said second liquid and mounted on said support means so that the position of said separating wall in said second liquid is adjustable in the vertical direction, said separating wall having a generally vertically surface along at least a portion of which the second liquid impinges during the relative movement of said device in the liquids, an upper portion of said surface of said separating wall presenting a horizontally convex configuration, the lower portion of said surface of said separating wall presenting a horizontally concave configuration, said wall having an upper overflow edge (9) positionable by the vertical movement of said separating wall proximate the boundary layer between the liquids and such that the first liquid flows over said overflow edge;

a vessel behind said overflow edge for receiving liquids passing over said edge;

a weir (6) mounted on said vessel and positioned in front of the lower portion of said separating wall in the direction of relative movement, said weir presenting a concave surface to the lower portion of said separating wall;

means (13, 14) intermediate said separating wall and weir for sealing said separating wall to said weir along two spaced parallel, horizontal planes while permitting vertical adjustment of said separating wall;

a fixed, base member with a pair of vertically spaced mounting means generally horizontally opposite said separating wall (8), said separating wall having a second surface on the other side of said wall from said convex-concave surface with a pair of spaced lugs (15, 16) mounted on said second surface and vertically spaced by the same amount as said mounting means; and a pair of generally parallel connecting rods (19, 20) having one end pivotally connected to said lugs and the other end pivotally connected to said mounting means of said base member.

2. The device according to claim 1 wherein said support means is further defined as positionable ahead of said separating wall in the direction of relative movement and wherein said support means includes float means for supporting said support means on the exposed, upper surface of the liquids.

3. The device according to claim 1 wherein said separating wall (8) is internally hollow for assuming a buoyant condition with respect to the second liquid.

4. A device according to claim 3 further including an air source means, said air source means being coupled to the upper portion of said separating wall for supplying and removing air to and from said internally hollow wall for altering the buoyant condition thereof; and an opening in the lower portion of said separating wall communicating with the hollow interior permitting the entry and discharge of liquid to and from the wall.

* * * * *